United States Patent [19]

Poncha

[11] 4,021,525

[45] May 3, 1977

[54] TRONA CALCINATION

[75] Inventor: Rustom P. Poncha, Syracuse, N.Y.

[73] Assignee: Allied Chemical Corporation, Morris Township, N.J.

[22] Filed: June 17, 1975

[21] Appl. No.: 587,577

[52] U.S. Cl. .......................... 423/184; 423/206 T; 423/421

[51] Int. Cl.² ......................................... C01D 7/00

[58] Field of Search ............. 423/184, 206 T, 179, 423/421

[56] References Cited

UNITED STATES PATENTS

| | | | |
|---|---|---|---|
| 3,838,189 | 9/1974 | Sopchak et al. | 423/206 T |
| 3,870,780 | 3/1975 | Guptill | 423/206 T |

*Primary Examiner*—O. R. Vertiz
*Assistant Examiner*—Wayne A. Langel
*Attorney, Agent, or Firm*—Gerhard H. Fuchs; Gerard P. Rooney

[57] ABSTRACT

In the process of making sodium carbonate from trona involving the steps of crushing the trona, calcining the crushed trona, dissolving the calcined trona to obtain a solution comprising sodium carbonate and insoluble impurities contaminated by soluble silicates and soluble carbonaceous matter, contamination of the sodium carbonate solution with soluble silicates is reduced by the improvement which comprises calcining the crushed trona at temperature of 200° C. to 600° C. in the presence of an additive selected from the group consisting of aluminum oxide and bauxite. When the trona is calcined in the presence of aluminum oxide or bauxite at temperatures of 350° to 600° C., then the sodium carbonate solution is low in both soluble silicate as well as carbonaceous matter.

8 Claims, No Drawings

TRONA CALCINATION

BACKGROUND OF THE INVENTION

Naturally occurring trona, such as found in subterranean deposits in Sweetwater and adjacent counties in Wyoming, consists mainly of sodium sesquicarbonate ($Na_2CO_3 \cdot NaHCO_3 \cdot 2H_2O$) containing about 3 to 15%, or, more generally, 5 to 10% by weight of insoluble impurities, mainly shale. Since the trona is usually found near the oil shale formations of the upper Colorado River basin, it is further contaminated by carbonaceous matter, usually in amount in the order of about 0.1 to 0.5% by weight, expressed as elemental carbon.

In the production of sodium carbonate from natural trona, it is usual procedure to calcine the trona at elevated temperature, in the order of 200° to 600° C., to obtain crude sodium carbonate:

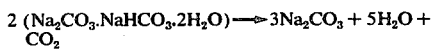

Calcination of the trona effects moisture removal, reduction or elimination of carbonaceous matter as well as transformation of the sodium sesquicarbonate into sodium carbonate. In general, elimination of organic matter is favorably influenced by increase in calcination temperature. However, calcination at elevated temperature also causes sodium carbonate to react with silica contained in the trona to form soluble silicates. The quantity of soluble silicates so formed increases materially with increase in calcination temperature.

Both, soluble carbonaceous matter as well as soluble silicates are major impurities in solutions obtained by dissolving calcined trona and, unless steps are taken to reduce contamination of sodium carbonate process liquors with soluble silicates and carbonaceous matter, these contaminants may become significant impurities in the soda ash prepared from such liquors. Carbonaceous matter, if not removed from the sodium carbonate process liquors, not only contaminates the soda ash product, but such carbonaceous matter also includes crystal habit modifiers which adversely modify the crystal structure of the sodium carbonate monohydrate produced by crystallization from the sodium carbonate process liquors, and further causes troublesome foaming of such liquors.

Two methods are commonly employed for eliminating undesirable carbonaceous matter in the trona soda ash process. The first method involves treatment of the trona process liquor with activated carbon. The major drawback of this approach is that not all of the critical organic crystal habit modifiers are readily absorbed and tend to remain in solution, causing less than ideal crystals to form. Furthermore, treatment of process liquors with activated carbon involves considerable expense and poses disposal problems for the spent carbon. The second method involves burning off the carbonaceous matter by conducting calcination at very high temperatures in excess of about 350° C. This method is quite effective, but unfortunately causes increase in formation of soluble silicates.

SUMMARY OF THE INVENTION

The present invention concerns an improvement in the process for making sodium carbonate from trona wherein contamination of sodium carbonate process liquors with soluble silicates is reduced, which involves calcining the crushed trona at elevated temperature in the presence of aluminum oxide or bauxite.

I have now discovered that in the process of making sodium carbonate from trona involving the steps of crushing the truna, calcining the crushed trona, dissolving the calcined trona to obtain a solution comprising sodium carbonate and insoluble impurities contaminated by soluble silicate and soluble carbonaceous matter, contamination of the sodium carbonate solution with soluble silicates is reduced by the improvement which comprises calcining the crushed trona at temperature of 200° to 600° C. in the presence as additives of aluminum oxide, bauxite, or mixtures thereof in any proportion. Contamination of the sodium carbonate solution with both, soluble silicates as well as soluble carbonaceous matter is reduced by calcining the crushed trona at temperature of 350° to 600° C. in the presence of aluminum oxide, bauxite, or mixtures thereof in any proportion.

It should be appreciated that reduction in soluble silicates and soluble carbonaceous matter, for purposes of the present invention, is relative to levels of soluble silicates and soluble carbonaceous matter obtained when calcination of the trona is conducted in the absence of added bauxite and/or aluminum oxide.

Calcination in the presence of aluminum oxide and/or bauxite in accordance with my invention may be conducted in conjunction with the usual calcination step wherein the sodium sesquicarbonate component of the trona is transformed into sodium carbonate, or, if desired, it may be carried out as a separate additional step following the usual calcination procedure.

DETAILED DESCRIPTION OF THE INVENTION AND OF THE PREFERRED EMBODIMENTS

Prior to calcination in the presence of additives in accordance with the present invention, the trona is first crushed to particle size predominately passing through ½ inch mesh screen, preferably 3 mesh screen (Tyler). If trona of substantially larger particle size is used, then the full benefits of the improvement of the present invention may not be obtained.

The additives may be added to the trona before or during calcination, preferably in finely divided form, say of particle size substantially passing through 20 mesh screen (Tyler), more preferably, passing through 50 mesh screen. The additives are employed in amount of from about 0.2 to about 5% by weight, based on the weight of the trona feed, preferably about 0.5 to about 3% by weight or, more preferably yet, about 1 to about 2% by weight based on the trona feed. If the additives are employed in amount of less than about 0.5% by weight, then reduction of soluble silicates may not be sufficiently significant from a practical point of view. Use of the additives in excess of about 2% by weight results in no particular additional benefits and would be wasteful. Indeed, use of aluminum oxide or bauxite in amount above about 2% by weight, based on the weight of the trona, may sometimes result in formation of soluble aluminate, which is undesirable. Hence, use of aluminum oxide or bauxite in amount in excess of about 2% by weight, based on the weight of the trona, is desirably avoided.

Calcination of the trona is ordinarily conducted in direct fired rotary furnace or in indirectly heated rotary furnaces, and both types of furnaces are eminently suitable for practice of the method of the present invention. However, any type of furnace capable of effecting heating the trona and the additive together to temperatures in the ranges below described is suitable for the practice of the present invention. Ordinarily, the aluminum oxide and/or bauxite additive and the trona are fed together to the furnace and are passed through the furnace in the usual manner. However, the additives need not be added initially to the trona as it is being fed to the furnace, but they may be added at a later time or at a point downstream in the furnace, so that the additives come into contact with the already calcined trona, which now comprises sodium carbonate together with insolubles and impurities. Trona and aluminum oxide and/or bauxite are intimately mixed, either before or during calcination.

Calcination of the trona in the presence of aluminum oxide and/or bauxite in accordance with the method of the present invention may be carried out at temperatures between about 200° and 600° C., preferably at temperatures between 350° and 500° C., more preferably yet at temperatures between about 350° and 400° C.

Calcination in the presence of aluminum oxide and/or bauxite in accordance with my invention is carried out for time sufficient to achieve reduction of soluble silicates and, optionally, reduction of soluble carbonaceous matter. Calcination times of 20 to 60 minutes are ordinarily sufficient to achieve these objectives. Indeed, time required for calcination of the trona to transform it into sodium carbonate is ordinarily sufficient to achieve the desired result of the method of my invention.

Following calcination in the presence of aluminum oxide and/or bauxite in accordance with the method of the present invention, the trona is dissolved in an aqueous medium, usually an aqueous sodium carbonate solution from previous operation, in usual manner to obtain a substantially saturated solution of sodium carbonate having reduced contamination with sodium silicate and soluble carbonaceous matter.

The Examples set forth below illustrate preferred practice of the present invention and set forth the best mode presently contemplated for its practice.

The following general procedures were employed in the Examples and Comparative Tests shown below:

Crude trona was ground to particle size substantially passing through 3 mesh screen (Tyler), the ground trona was intimately mixed with finely divided additive (passing through 50 mesh screen (Tyler) in the proportions indicated and the mix was calcined at the indicated temperature for 45 minutes in a stainless steel tray in a muffle furnace.

Following calcination, the calcined mixture was dissolved in deionized water contained in a stainless steel beaker immersed in an oil bath maintained at 90° C. with thermostatic control. The beaker was equipped with stirrer and cover. When the temperature of the water reached [75° C., the calcined mixture was added in amount calculated to give 28% $Na_2CO_3$ solution. The temperature of the water reached 90° C. because of the exothermic hydration reaction. After 30 minutes, a 50 ml portion of the solution was withdrawn and filtered through a Whatman 42 filter paper into 50 ml of water.

Soluble silicate was determined photometrically. For high silicate levels (5000 ppm $SiO_2$, basis $Na_2CO_3$ or above) the sample was acidified to pH 1.4 and ammonium molybdate was added to form the yellow complex. The absorbance was measured at 410 millimicrons. For lower silicate levels the yellow complex was reduced with 1-amino-2-naphthol-4-sulfonic acid to molybdenum blue and the measurement was made at 660 millimicrons. The silicate concentrations were read off appropriate standard curves.

EXAMPLES I to VI

COMPARATIVE EXPERIMENTS 1 to 6

Intimate mixtures of 196 parts trona and 4 parts bauxite were prepared and calcined as described above at temperatures indicated in the Table below. Blank tests (Comparative Experiments) employing trona only without bauxite addition were run concurrently. Results are summarized in the Table below.

TABLE

| Temp. °C | $SiO_2$, ppm (basis $Na_2CO_3$) | |
|---|---|---|
| | Trona+Bauxite | Trona Only |
| 200 | 61 | 137 |
| 300 | 38 | 152 |
| 350 | 41 | 206 |
| 400 | 55 | 335 |
| 500 | 98 | 630 |
| 600 | 208 | 2818 |

The data in the above Table clearly illustrate the surprising effect of bauxite in reducing soluble silicate content of trona calcined at temperatures of 200° to 600° C. Even at temperatures above 350° C. up to and including 500° C. the soluble silicate content of the sodium carbonate liquor obtained from the calcined trona is consistently below 100 ppm, expressed as $SiO_2$, basis $Na_2CO_3$. This is of considerable significance since beginning at about 350° C. contamination of the calcined trona with soluble carbonaceous matter decreases with increasing calcination temperatures. Previously however, operation of temperatures above about 350° C. resulted in intolerably high levels of soluble silicates. Addition of bauxite and/or aluminum as per my invention permits calcination of trona at temperatures sufficiently high to reduce soluble carbonaceous matter, while avoiding problems of high soluble silicate contamination.

Calcination of trona in the presence of additive as per my invention has the further beneficial effect that trona so calcined, on dissolution, yields a solution comprising sodium carbonate and insoluble impurities having improved settling and filtration characteristics.

When in the above Examples aluminum oxide is substituted for the bauxite, or when bauxite or aluminum oxide are used in other proportions within the purview of the present invention, similar results are obtained, that is to say, calcined trona is obtained which upn dissolution upon sodium carbonate solutions having desirably low contamination with soluble silicates and, if calcination is conducted at sufficiently high temperatures, having low contamination with soluble carbonaceous matter as well.

Since various changes may be made in carrying out the process of my invention without departing from its scope and essential characteristics, all matter contained in the above description shall be interpreted as illustrative only and not in a limiting sense.

I claim:

1. In the process of making sodium carbonate from trona involving the steps of crushing the trona, calcining the crushed trona, dissolving the calcined trona to obtain a solution comprising sodium carbonate and insoluble impurities, contaminated by soluble silicates, contamination of the sodium carbonate solution with soluble silicates and soluble carbonaceous matter is reduced by the improvement which comprises calcining the crushed trona at temperatures of 200° C. to 600° C. in the presence of from 0.2 to 5 parts by weight per 100 parts of trona of an additive selected from the group consisting of bauxite, aluminum oxide and mixtures thereof in any proportion.

2. The improvement of claim 1 wherein the additive is bauxite.

3. The improvement of claim 2 wherein the trona is calcined at temperature of 350° to 600° C.

4. The improvement of claim 2 wherein the trona, prior to calcination, is reduced to particle size predominantly passing through 3 mesh screen (Tyler), and the bauxite is of particle size substantially passing through 20 mesh screen (Tyler).

5. The improvement of claim 2 wherein the bauxite is added in amount of from 0.5 to 3 parts by weight per 100 parts of trona.

6. The improvement of claim 1 wherein the trona, prior to calcination, is reduced to particle size predominantly passing through 3 mesh screen (Tyler), and the additive is of particle size substantially passing through 20 mesh screen (Tyler).

7. The improvement of claim 6 wherein the additive is bauxite and is added in amount of from 0.5 to 3 parts by weight per 100 parts of trona.

8. The improvement of claim 1 wherein the trona is calcined at temperature of 350° C. to 600° C.

* * * * *